(12) United States Patent
Cramatte

(10) Patent No.: US 6,488,298 B1
(45) Date of Patent: Dec. 3, 2002

(54) VEHICLE WHEEL SUSPENSION

(75) Inventor: Olivier Cramatte, Bourogne (FR)

(73) Assignee: Gaussin S.A., Hericourt (FR)

( * ) Notice: Subject to any disclaimer, the term of this patent is extended or adjusted under 35 U.S.C. 154(b) by 0 days.

(21) Appl. No.: 09/763,501

(22) PCT Filed: Sep. 2, 1999

(86) PCT No.: PCT/FR99/02091

§ 371 (c)(1),
(2), (4) Date: Feb. 22, 2001

(87) PCT Pub. No.: WO00/13924

PCT Pub. Date: Mar. 16, 2000

(30) Foreign Application Priority Data

Sep. 3, 1998 (EP) .......................................... 98440193

(51) Int. Cl.⁷ ................................................ B60G 3/12
(52) U.S. Cl. ......................... 280/124.128; 280/124.13; 267/249
(58) Field of Search .................. 280/124.128, 124.129, 280/124.13, 124.153, 124.179; 267/248, 249

(56) References Cited

U.S. PATENT DOCUMENTS

| | | | |
|---|---|---|---|
| 2,823,927 A | * 2/1958 | Goby | 267/221 |
| 3,211,468 A | * 10/1965 | Flowers | 267/250 |
| 3,326,544 A | * 6/1967 | Smith | 267/198 |
| 4,145,073 A | * 3/1979 | McLuckie et al. | 280/124.101 |
| 4,344,643 A | 8/1982 | Ray | |

FOREIGN PATENT DOCUMENTS

| | | |
|---|---|---|
| DE | 3 517 130 | 11/1986 |
| DE | 3 839 433 | 10/1989 |
| EP | 0 026 131 | 4/1981 |
| FR | 670 188 | 12/1929 |
| FR | 709 406 | 8/1931 |

* cited by examiner

*Primary Examiner*—Eric Culbreth
*Assistant Examiner*—Faye M. Fleming
(74) *Attorney, Agent, or Firm*—Harrison & Egbert

(57) ABSTRACT

The invention concerns a vehicle (1) wheel suspension (8), of the trailer type with a steering axle (2, 3), including an axle support arm (9), mounted pivoting, at one (10) of its ends, on a fork (11) directly mounted on a support structure (1, 2) of the member controlling (5) the axle (2, 3) and cooperating at its opposite end (14) with a damper (13) urged to be inserted between the arm (9) the support and structure (12). The suspension is characterized in that the damper (13) consist of a helical spring (15) designed to act, exclusively, in compression by the action of a guider (16) maintaining and guiding it in the form of two parts (17, 18) capable of being nested while being capable of sliding one inside the other in the axial direction relative to the spring (15), countering the action thereof, the parts (17, 18) being mounted parallel to the axle (2, 3), one (17) on the axle supporting arm (9) and the other (18) on the support structure (12), respectively.

6 Claims, 2 Drawing Sheets

VEHICLE WHEEL SUSPENSION

BACKGROUND OF THE INVENTION (1) Field of the Invention

The invention relates to a wheel suspension for a vehicle, in particular for a vehicle such as a trailer with a driving axle for the transport of heavy loads, comprising an axle-bearing arm extending towards the front or the rear of the vehicle, this arm, on the one hand, being mounted in a pivoting way, at its one end, onto a cover plate inserted against a bearing structure for the axle-driving organ and, on the other hand, cooperating, in particular through its opposite end, with shock-absorbing means interposed between this arm and said bearing structure.

The present invention relates, in particular, to the field of the transport vehicles such as trailers with a driving axle.

(2) Description of the Related Art

In this respect, one should note that in the harbor or airport areas, there can very often be seen vehicles with a set of trailers, the latter being mounted on driving axles and connected to each other by hinging means forming control means for the orientation of these driving axles, with a view to a bicycle-gear-type movements of the set.

Presently, the wheels of such trailers are seldom sprung, which is a problem for the transport of heavy loads, since the passing of obstacles at the level of the -road results into huge stresses at the level of both the trailer and the load itself. Now one can observe that the grounds on which this kind of set of trailers with a bicycle-gear-type of movement has to move are increasingly more uneven. whereas the size of the trailers and the weight of the transported loads, have a tendency to increase.

In this context, one has already thought of using blade springs for springing the wheels of such trailers, which has some drawbacks.

First of all, these blade springs are of a not inconsiderable size and require the loading platform of these trailers to be raised.

In addition, their range of spring movement is relatively large and results in a coupling-pole height varying according to whether the trailer is loaded or not. Under such circumstances, it is particularly difficult to contemplate the possibility of automatically coupling or uncoupling the trailers to or from each other. Now, it should, as a matter of fact, be possible to perform these operations without it being necessary for the driver to leave his towing vehicle. As a matter of fact, one should note that, in order to allow such an automatic uncoupling and, inversely, coupling of these trailers, the latter are provided, at the level of their front axle, with a coupling pole on which acts a system for self-compensating the load that allows it to be automatically maintained horizontal. Furthermore, the fastening the rear driving axle receives is provided with a round groove facilitating the insertion, at the level of this fastening, of the free end of the coupling bar of the next trailer.

Besides that, there are also known wheel-suspension systems that consist of an axle-bearing arm substantially extending towards the front or, as the case may be, towards the rear of the vehicle and one end of which is mounted in a pivoting way on a cover plate made integral with the chassis of said vehicle. Between this arm, which the axle receiving the wheels at its ends is hence fixed to, and said chassis of the vehicle are also interposed shock-absorbing means in the form of a spring directly made integral, at its ends, with this arm and with the chassis. Such shock-absorbing means can also be in the form of a cylindrical block or a pneumatic or oil and air system.

In this respect, though the solution of the cylindrical block is not suitable for the transport of heavy loads, whereas a pneumatic system requires the installation on the vehicle of a large reserve of air, because of the large difference between the weight when unloaded and the total weight when loaded, a spring of a helical type the ends of which are fixed to the axle-bearing arm and at the level of the vehicle must act not only in compression, but also in bending. This not only causes the mechanical parts of the wheel suspension to operate in bad conditions, but, in the case of a driving axle, such a wheel suspension can have an influence on the orientation of this axle, which impedes the correct working of the bicycle-gear-type movement of a set of trailers.

BRIEF SUMMARY OF THE INVENTION

To this end, the invention relates to a wheel suspension for a vehicle, in particular for a vehicle such as a trailer with a driving axle for the transport of heavy loads, comprising an axle-bearing arm extending towards the front or the rear of the vehicle, this arm, on the one hand, being mounted in a pivoting way, at its one end, onto a cover plate inserted against a bearing structure for the axle-driving organ and, on the other hand, cooperating, in particular through its opposite end, with shock-absorbing means interposed between this arm and said bearing structure and consisting of a helical spring so designed as to be capable of acting exclusively in compression under the action of means that ensure its hold and guiding and that are in the form of two parts fitting into each other while being capable of sliding in each other in the direction axial to the spring, against the action of the latter, these parts being mounted in a pivoting way about a spindle parallel to the axle, one of them on said axle-bearing arm and the other one on said bearing structure, and, on the other hand, an axle is fixed on a bearing arm so as to be substantially located on the vertical axis of pivoting of the driving organ of this axle.

According to another feature of the present invention, the axle-bearing arm includes means for receiving and fixing the axle, taking into consideration, in this respect, that these fixing means can be inserted at a determined distance from the pivoting end of said bearing arm, according to the amplitude of the range of spring movement such a wheel suspension should allow.

The advantages resulting from the present invention reside in that in order to cope with the problem set forth, it is enough to use a helical spring and not a pneumatic system, which is necessarily more voluminous, while this spring is impeded from acting in any other way than in compression, which, otherwise, would result into putting the elements of the wheel suspension under stress, even result in having an influence on the orientation of the wheels, wherein such difficulties could not have been eliminated in another way than by using very complex and, of course, expensive mechanical retaining means for the bearing arm.

Further aims and advantages of the present invention will clearly appear from the following description, with reference to the attached drawings corresponding to an exemplary embodiment.

Figure 1:
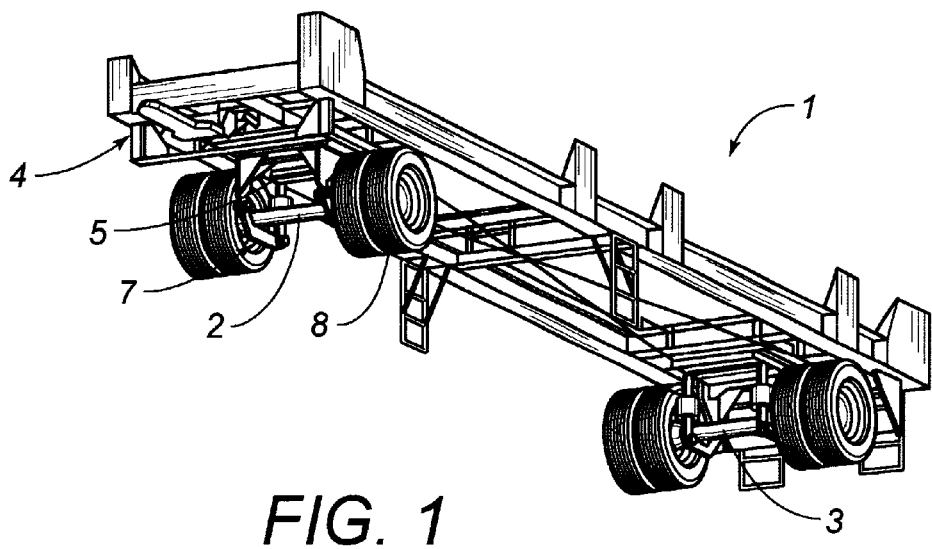
FIG. 1 is a schematic perspective top view of a vehicle such as a trailer with driving axles.

DETAILED DESCRIPTION OF THE INVENTION shown in the attached FIG. 1, this invention relates, in particular, to the field of the vehicles such as a trailer 1 with driving axles 2, 3 for the transport of heavy loads.

As a matter of fact, in this FIG. 1 it has been shown, in particular, a trailer both the front axle 2 and the rear axle 3 of which are driving axles mechanically, hydraulically or pneumatically connected to each other, with a view to a synchronous pivoting of these axles. Their orientation is controlled through hinging means 4 that are capable of ensuring the connection of such a trailer to a towing vehicle or to another trailer, this connection made with a view to a bicycle-gear-type movement of the set of vehicle wheels thus formed.

As can also be seen in this FIG. 1, the driving organ 5 of these axles 2, 3 is here defined by a ball crown 6 as shown in particular in the following FIGS. 2 and 3.

In this respect, the invention consists of a springing 7 of the wheels 8 for this kind of transport vehicle. This springing 7 includes an axle-bearing arm 9 extending, as the case may be, towards the front or the rear of the vehicle 1, while being mounted in a pivoting way, at its one end 10, at the level of a cover plate 11 that is, in turn, inserted against the bearing structure 12 of the driving organ 5, in particular, of the ball crown 6.

This bearing arm 9 is also brought into cooperation with shock-absorbing means 13, the latter being interposed between this arm 9 and said bearing structure 12. The bearing arm 9 preferably acts on these shock-absorbing means 13 at the level of its end 14 opposite the one 10 that is mounted in a pivoting way on the cover plate 11.

Figure 2:
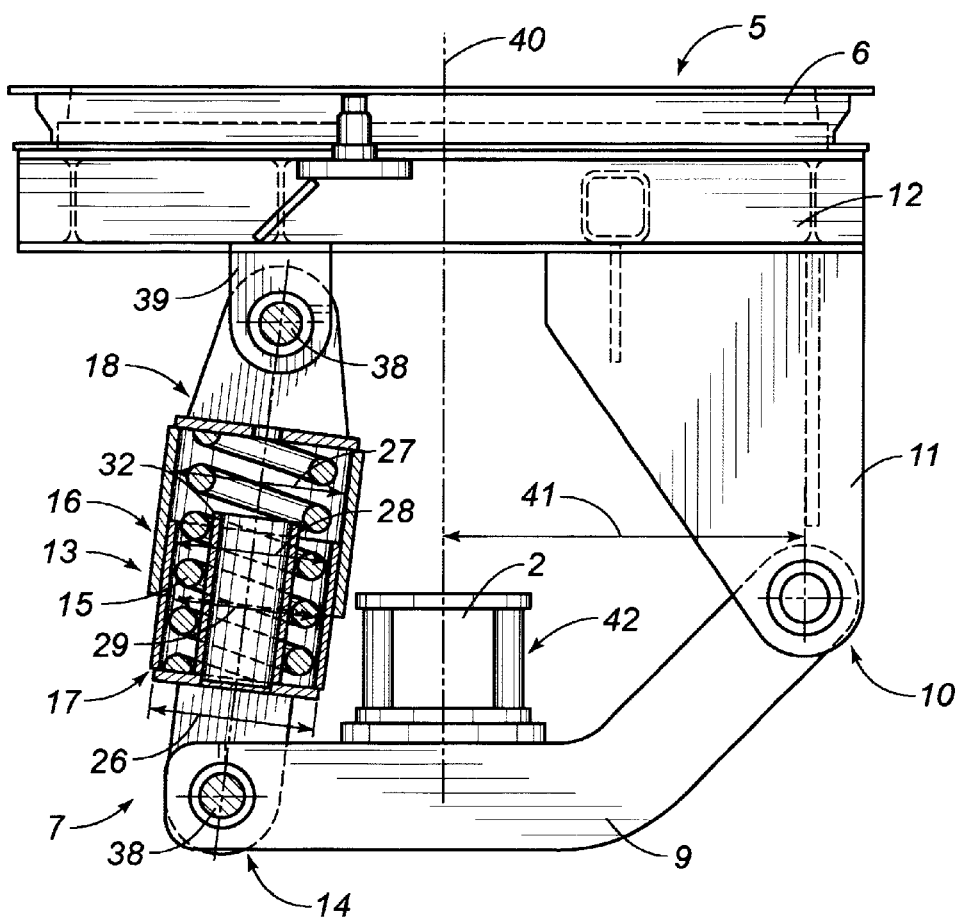
FIG. 2 is a schematic elevation view of a wheel suspension according to the invention.
Figure 3:
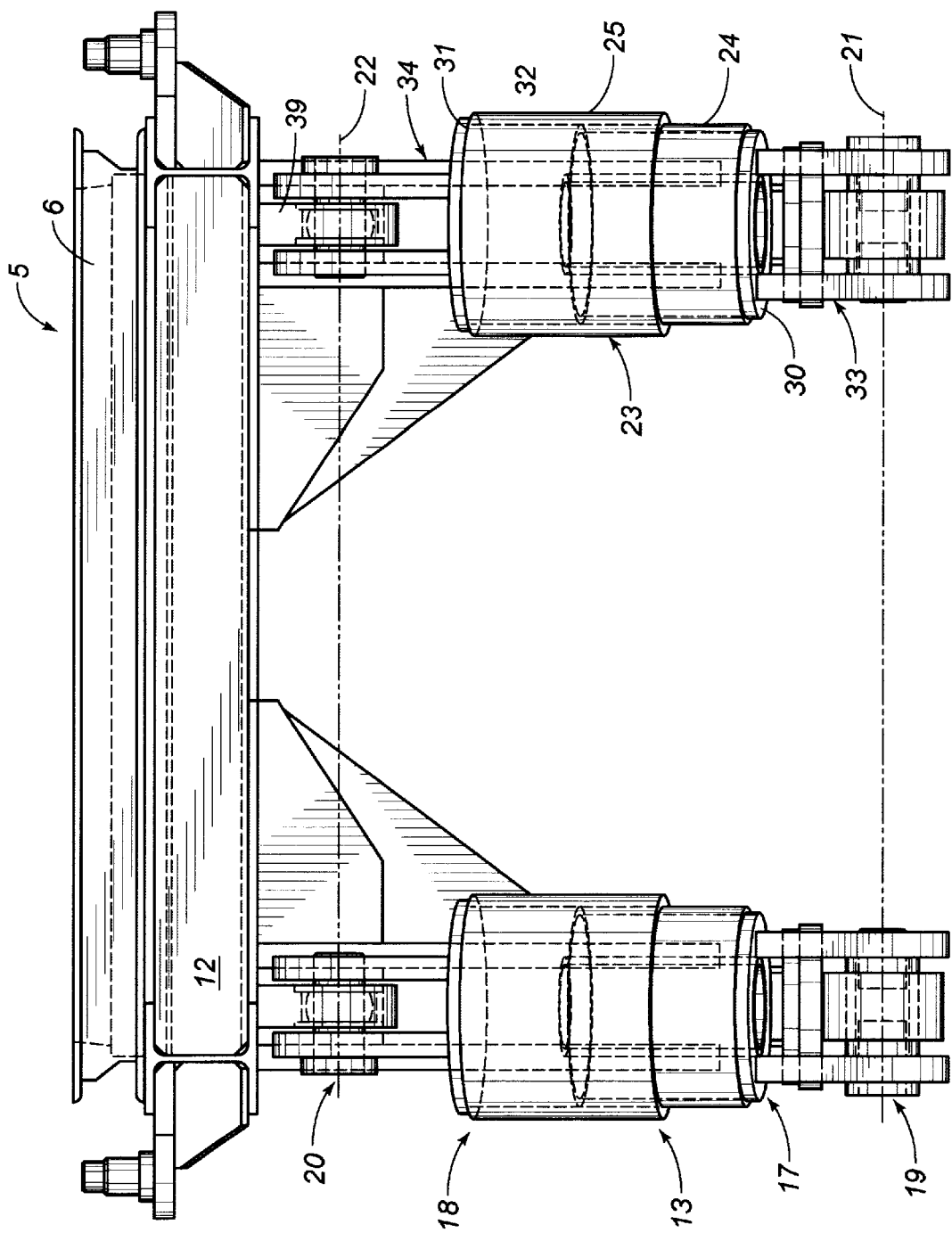
FIG. 3 is a schematic elevation view of both wheel suspensions corresponding to each of the wheels of an axle and being fixed under the driving organ, in this case, a ball crown.

According to a particular feature of the present invention, the shock-absorbing means 13 consist of a helical spring 15, schematically shown in the FIGS. 2 and 3, this spring 15 being designed so as to be capable of acting exclusively in compression, under the action of means 16 that ensure its hold and guiding. Such means 16 substantially consist of two parts 17, 18 of a type that fit into each other, while being capable of sliding in each other in the direction axial to the helical spring 15, against the action of the latter. These parts 17, 18 are, furthermore, mounted in a pivoting way, through hinging means 19, 20, about a spindle 21, 22 parallel to the axle 2, on said arm 9 and on said bearing structure 12 corresponding to the ball crown 6, respectively.

According to a preferred embodiment shown in the FIGS. 2 and 3, these parts that can fit and slide in each other so as to define a casing 23 for receiving the spring 15, as a matter of fact, with a view to its hold and guiding. In particular, each of these parts 17, 18 includes a tubular portion 24, 25 of a cylindrical shape and closed by a bottom 30, 31, one 24 of them having an outer cross-section 26 adjusted to the inner one 27 of the other tubular portion 25, the inner cross-section 28 of the tubular portion 24 also being adjusted to the diameter 29 of the helical spring 15. One should note that this adjustment takes into consideration the increase in diameter such a spring can undergo during its compression under the action of the weight of the load that can be arranged on the trailer 1.

Finally, this hold and guiding of the helical spring 15 to ensure that it can act only in compression can also be completed with a tubular ferrule 32 axially extending from the bottom 30, 31 and inside the tubular portion 24 and/or 25 of at least one of the parts 17, 18, this tubular ferrule 32 being defined by an outer cross-section adjusted to the internal recess of said helical spring 15.

In this respect, though, within the framework of the above-described embodiment, the hold and guiding of the helical spring 15 is ensured outside the latter, which has the advantage of perfectly enclosing this spring 15 and of thus ensuring its protection against corrosive external agents, for instance, or also in order to avoid any accident due to a clamping, this hold and guiding of said spring 15 can also be achieved through tubular portions that can fit and slide in each other and extend inside this helical spring 15 and have a cross-section adjusted to the recess of the latter.

In particular, one of the tubular portions has, under such circumstances, an outer cross-section, as a matter of fact, adjusted to this recess of the helical spring 15, whereas the other tubular portion has, in turn, a cross-section adjusted to the inner one of the tubular portion that has been referred to above. In such a design, said helical spring 15 rests on supporting side plates extending under the various tubular portions.

As regards the hinging means 19, 20 connecting the parts 17, 18, as the case may be, to the bearing arm 9 or to the bearing structure 12, these are defined by cover plates 33, 34 extending from the bottom 30, 31 of the tubular portions 24, 25 and bearing a spindle 38 on which is mounted in a pivoting way, as the case may be, the end 14 of the bearing arm 9 or a lug with an eyelet 39 inserted against the bearing structure 12 of the ball crown 6.

One should note, in this respect, that such wheel suspensions 7 according to the invention are inserted under the bearing structure 12 of the driving organ 5, in this case on the ball crown 6, symmetrically with respect to the longitudinal median plane of the trailer 1. Furthermore, the axle 2 is, in turn, fixed to the bearing arms 9 of these wheel suspensions 7, so as to be located, on the one hand, substantially on the vertical axis of pivoting 40 of the driving organ 5 and, on the other hand, at a distance 41 from the pivoting end 10 of the bearing arm 9 determined according to the range of spring movement one wants to impart to the wheels 8 through these wheel suspensions 7.

The fixing of an axle 2, 3 to said bearing arms 9 is achieved through straps 42 the latter is provided with to this end.

Finally, as results from, the preceding description, the wheel suspension according to the invention allows the user to advantageously solve the problem initially set forth, i.e. that it has a reduced size, that it allows a range of spring movement limited to the wheels 8 of the driving axles 2, 3 and, especially, that it uses a simplified technology, either a simple helical spring the action of which is controlled so as to act only in compression, impeding the various organs such a wheel suspension is comprised of from operating in bad conditions.

What is claimed is:

1. A wheel suspension apparatus comprising:

a trailer having a front driving axle and a rear driving axle;

an axle-bearing arm extending a direction toward one end of said trailer;

a driving organ connected to one of said driving axles, said driving organ having a vertical axis of pivoting;

a bearing structure positioned against said driving organ;

a cover plate connected at one end to said bearing structure, said axle-bearing area having one end pivotally mounted to an opposite end of said cover plate;

a shock absorbing means connected to an opposite end of said axle-bearing area, said shock absorbing means comprising:

a helical spring;

a first spring receiving part;

a second spring receiving part fitted upon said first spring receiving part and helical spring positioned interior of said receiving parts and acting only in compression therein, and receiving parts slidable with respect to each other along an axis aligned with a central axis of said helical spring, said helical spring bearing against said receiving parts during the slideable movement thereof;

a first spindle pivotally mounted to said first spring receiving part, a second spindle pivotally mounted to said second spring receiving part, said first and second spindles being parallel to said one of said driving axles, said first spring receiving part connected to said axle-bearing arm, said spring receiving part pivotally connected to said bearing structure, said one of said driving axles mounted on said axle-bearing arm so as to be substantially located on said vertical axis of pivoting of said driving organ.

2. The apparatus of claim 1, each of said spring receiving parts defining a casing receiving and helical spring interior thereof, each of said receiving parts having a tubular portion therein, said tubular portion having a cylindrical shape with a closed end opposite the other receiving part, said first spring receiving part having an outer diameter substantially matching an inner diameter of said second spring receiving part, said first spring receiving part having an inner diameter substantially matching an outer diameter of said helical spring.

3. The apparatus of claim 2, one of receiving parts having a tubular ferrule axially extending from the closed end thereof toward the other of said receiving parts, said tubular ferrule having an outer diameter substantially matching an inner diameter of said helical spring, said helical spring positioned over and around said tubular ferrule.

4. The apparatus of claim 2, said first spring receiving part having a first cover plate extending outwardly from the closed end thereof, said first cover plate pivotally receiving said first spindle therein, said second spring receiving part having a second cover plate extending outwardly from the closed end thereof, said second cover plate pivotally receiving a lug with an eyelet extending from said bearing structure.

5. The apparatus of claim 1, one of said receiving parts having a first tubular portion positioned therein, said first tubular portion having an outer diameter substantially matching an inner diameter of said helical spring, said first tubular portion extending through an internal recess of said helical spring, the other of said receiving parts having a second tubular potion having an outer diameter substantially matching an inner diameter of said first tubular portion, said second tubular portion extending into said first tubular portion.

6. The apparatus of claim 1, said one of said axles being fixed to said axle-bearing arm by a strap at a distance from a pivoting end of said axle-bearing arm.

\* \* \* \* \*